United States Patent Office
2,879,709
Patented Mar. 31, 1959

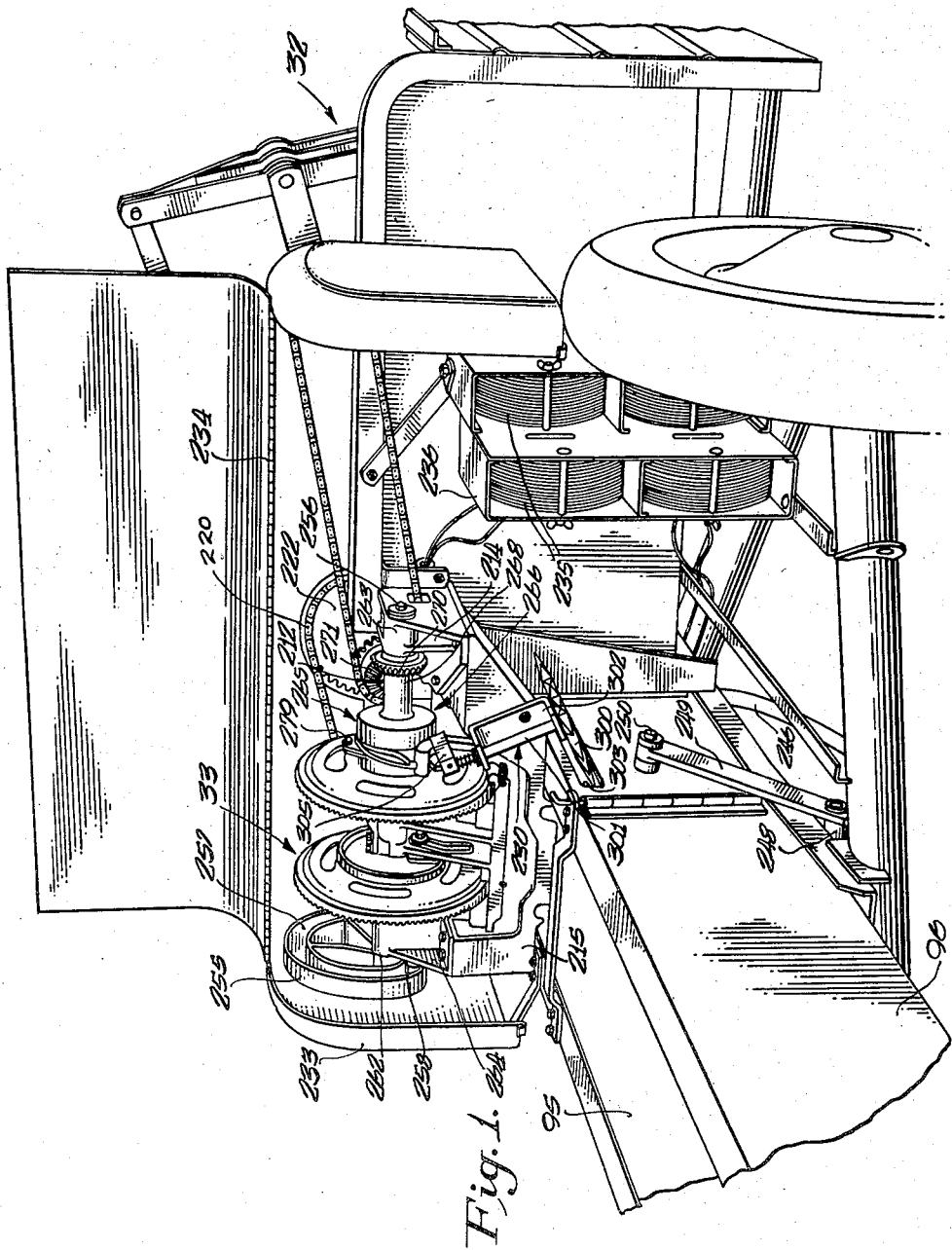

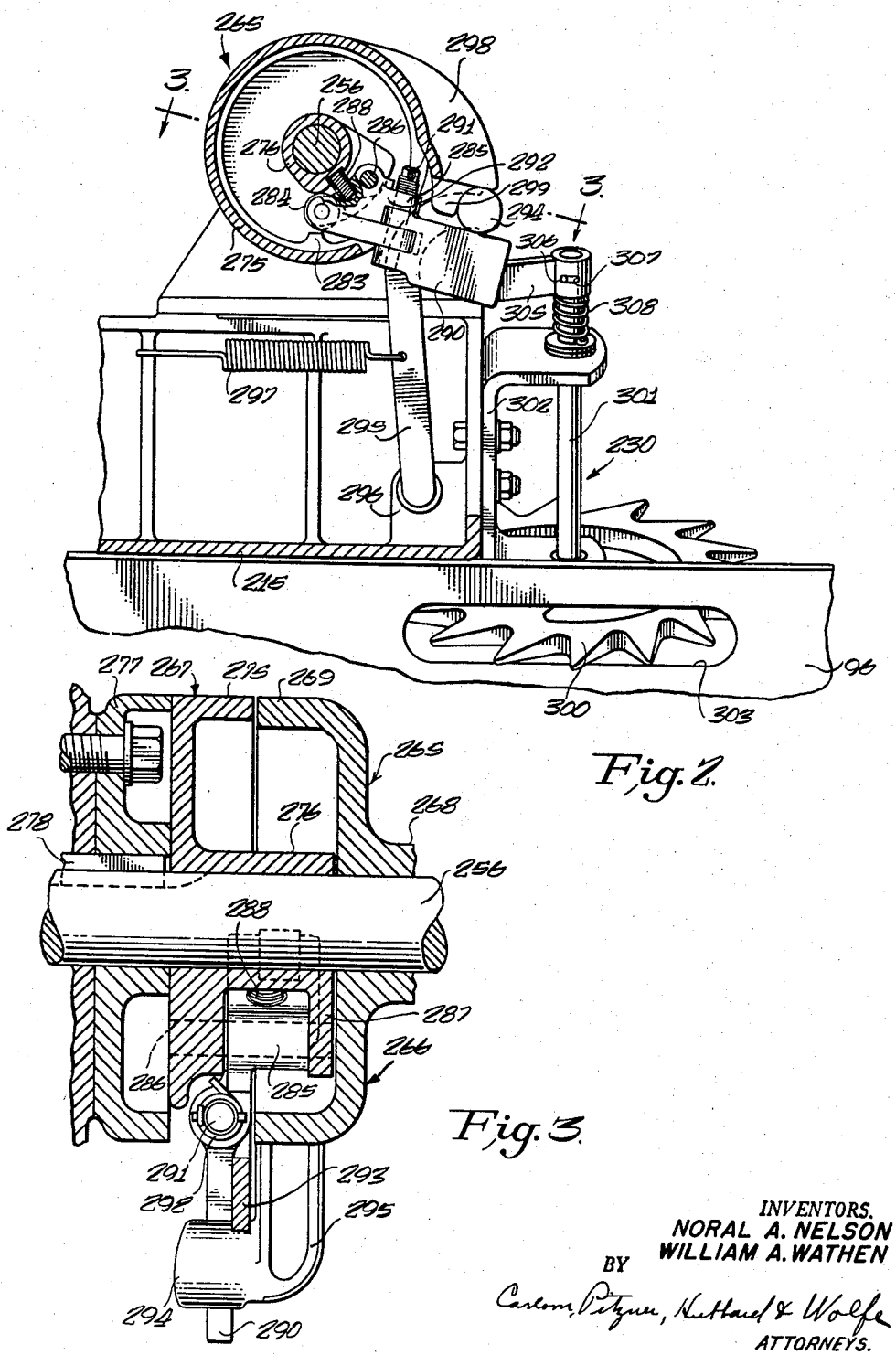

2,879,709

DRIVE MECHANISM FOR BALE TIERS

Noral A. Nelson, Holland, and William A. Wathen, Detroit, Mich.

Original application April 26, 1955, Serial No. 504,081. Divided and this application July 2, 1956, Serial No. 595,514

7 Claims. (Cl. 100—4)

The invention relates to tying mechanisms for baling machines and it is more particularly concerned with improved means for driving such tying mechanism. This application is a division of our copending application, Serial No. 504,081, filed April 26, 1955.

One object of the invention is to simplify the drive for bale tying mechanisms and to provide a rugged and durable drive mechanism which is efficient and reliable in operation and which is characterized by its extreme compactness.

Another object is to provide a drive mechanism of the above general character in which the complex linkage heretofore required between the clutch and the bale operated metering and trip mechanism is completely eliminated, thus simplifying the mechanism, reducing its cost and making it easier to maintain in proper operating condition.

Other objects and advantages of the invention will become apparent from the following detailed description of the preferred embodiment illustrated in the accompanying drawings, in which:

Figure 1 is a fragmentary perspective view of a hay baler and its tying mechanism, the latter being driven by clutch and trip mechanism embodying the features of the invention.

Fig. 2 is a sectional view through the drive shaft of the tying mechanism taken in a vertical plane through the inner end of the clutch housing.

Fig. 3 is a fragmentary sectional view through the clutch taken in a plane substantially on the line 3—3 of Fig. 2.

For purposes of illustration, a preferred embodiment of the invention has been shown and will be described herein in some detail. It is to be understood, however, that this is not intended to limit the invention to the particular structural details herein disclosed. On the contrary, the intention is to cover all modifications and adaptations falling within the spirit and scope of the invention as it is more broadly and generally characterized by the appended claims.

To illustrate the functioning of the driving means constituting the present invention in the environment in which it is frequently called upon to operate, the drive has been shown as incorporated in what is commonly known as a hay baler. This particular baler is a mobile field or pickup baler, that is, a baler adapted to be drawn through a field by a tractor or other motive-powered vehicle and equipped with suitable means for picking up from the ground the hay or other material to be baled. The material so picked up is fed into a baling chamber by transfer mechanism indicated generally at 32 and such material is compressed into firm bales by a plunger reciprocating within the baling chamber.

In the particular machine illustrated, the baling chamber is formed in part by a pair of channel-shaped side members 95 and 96 supported in spaced parallel relation. As the baling operation proceeds the bale in process of formation is pushed back gradually in the baling chamber until the desired size is reached. At that time mechanism is brought into play for wrapping strands of tying material, which may be either wire or twine, around the completed bale and such strands are securely tied together by tying mechanism 33.

As herein shown, the tying mechanism 33 is supported on a frame 215 rigidly mounted on the bale defining channels 95 and 96 in overlying relation to the baling chamber. For protection, the mechanism is commonly enclosed in a sheet metal housing 233, which, in the present instance, has its rear portion hinged as at 234 to swing upwardly and thereby provide convenient access to the mechanism. The strand material supplied for tying the bales is supplied in continuous strands from a group of spools or rolls 235 carried in compartments provided in a housing 236 supported adjacent one end of the housing 233.

In the exemplary machine, the tying strands are carried through the baling chamber and thus wrapped around the bale by means of needles 246 carried by a cross bar 248 secured between the lower ends of a pair of depending arms 249 pivoted as at 250 at opposite sides of the baling chamber.

The needle assembly is rocked between the idle or retracted position in which it is shown in Fig. 1 and the operated position with the arms 249 swung forwardly by means of a cam 255 mounted on a cyclically driven shaft 256. This shaft also drives the tying mechanism 33. Cam 255 as shown is formed with a continuous suitably shaped groove 257 in its inner face within which rides a follower 258 operable through a suitable linkage to rock the needle assembly between operated and retracted positions.

As shown in Fig. 1, the shaft 256 is journalled at opposite ends in bearings 262 and 263, the latter being formed as a part of a bracket 214 for a shaft 212 which constitutes a part of the drive for the transfer mechanism 32. The bearing 262 in this instance, is formed as a part of a bracket 264 bolted or otherwise removably attached to the top of the frame member 215 adjacent the inboard end of the member. The shaft 212 is driven in timed relation to the reciprocation of the baling plunger and the oscillation of the transfer mechanism through the medium of a drive chain 220 running over a sprocket wheel 222 fixed to the shaft. The shaft 256 in turn is driven from the shaft 212 in timed relation to the drive for the other elements of the baler through drive mechanism comprising a single revolution clutch 265 operating under control of a metering device 230 constituting the present invention.

The clutch 265 in its preferred form comprises a driving member 266 and a driven member 267 mounted together upon the shaft 256. In the particular form of the clutch illustrated, the driving member 266 comprises a hub portion 268 terminating in a bell-shaped housing 269. The hub 268 is rotatably supported on the shaft 256 and has the end opposite the housing externally splined for driving engagement with a beveled gear 270 by which the clutch member is continuously driven from a beveled pinion 271 fast on the shaft 212. It will be evident therefore that the clutch member 266 is driven in timed relation to the drives for the other mechanisms of the baler since all drives are derived from a common transmission.

The driven clutch member 267, as herein shown, comprises a cup-shaped element 275 having a coaxial sleeve portion 276 projecting beyond the open end of the element and extending into the housing 269 of the driving member when the clutch parts are assembled on the shaft as shown in Fig. 3. The driven clutch member is drivingly coupled to the shaft 256 through the medium of a driving plate 277 secured to the shaft as by a key 278, The plate and element 275 are rigidly secured together in side-by-side relation by a shear bolt 279 (Fig. 1) inserted through apertured flange-like extensions formed respectively on the plate and the element.

To provide a disengageable connection between the driving and driven clutch members, the bell housing 269 is formed with an inwardly projected tooth or dog 283 (Fig. 2) engageable with a roller 284 journalled on a clutch finger 285 pivotally supported on the clutch element 275 to swing transversely of the axis of the element and into and out of the path of the dog 283. As herein shown, support for the clutch finger is provided by a pin 286 received in alined apertures in the inner face of the member 275 and in a radially projecting lip 287 formed on the hub 276 of the member. A compression spring 288 acting between the hub and the finger urges the latter in a direction to interpose the roller 284 in the path of the clutch dog whereby to engage the clutch.

Supported on the clutch finger 285 for pivotal movement about an axis transverse to the finger pivot is a trip arm 290. As shown in Figs. 3 and 4, the pivotal support for the trip arm is provided by a pin 291. A torsion spring 292 provided on the pin yieldably urges the arm anticlockwise (as viewed in Fig. 3) and holds it against a stop lug 293 on the clutch finger 285. As the driven clutch member rotates, the trip arm is traversed through a circular path intercepted by the radially projecting cylindrical head 294 of a trip release arm 295. This arm is pivoted on a support 296, in this instance, formed as an integral part of the frame structure 215, the pivot being located so that the release arm is swingable toward and from the clutch. A tension spring 297 acting between the frame and the release arm yieldably maintains the arm in a position to intercept the trip arm. Upon interception of the trip arm the trip finger 285 is rocked to the disengaged position in which it is shown in Fig. 2. In this position the roller 284 is lifted out of the path of the dog 283, thus interrupting the driving connections between the driving and the driven clutch members.

It will be evident that engagement of the clutch may be effected by releasing the trip finger assembly so that the spring 288 may rock the finger and its roller 284 to the engaged position. Such release is effected by swinging the trip arm 290 on its pivot on the pin 291 clockwise as viewed in Fig. 3 until it clears the release arm head 294. When the trip arm passes beyond the head, spring 288 rocks the clutch finger to engaged position and the driven clutch member starts rotation. Spring 292 restores the arm to its normal position, as explained hereinafter, so that it will be intercepted by the release arm as the driven clutch member completes its single revolution.

As the driven clutch member 275 approaches the end of a revolution, a cam or guide projection 298 on the member swings the release arm 295 outwardly to clear the projecting parts of the clutch but allows the arm to spring back to its normal rest or intercepting position with the head 294 engaged in a recess formed in a stop lug 299 located adjacent the end of the cam projection. The release arm in that position intercepts the trip element 290 and thus interrupts the driving connection after one revolution of the driven clutch member.

In the particular environment shown, engagement of the clutch 265 is effected under control of the metering device 230 which acts to measure a bale in process of formation. The cooperative relationship between the metering device and the clutch is such that the device can be mounted very close to the clutch, thus providing a very compact structure and eliminating complicated linkage connections of the type heretofore required.

The metering device 230, as shown in Fig. 2, comprises a toothed wheel 300 fixed to the lower end of a generally vertical shaft 301 journalled in a bracket 302 rigidly attached to the frame member 215 at one side of the baling chamber. The bracket is positioned so that the edge portion of the wheel 300 projects through a slot 303 in the side wall 96 of the baling chamber for engagement with the bale as the bale moves rearwardly in the chamber. The bale, of course, moves back as it is gradually built up and the metering wheel and its shaft rotate proportionately.

Mounted directly upon the upper end of the shaft 301 is a radially projecting metering finger 305 having its outer end positioned for engagement with the trip arm 290 as the finger rotates with the metering shaft. The arm and shaft are connected for limited relative rotation by a pin 306 fixed on the shaft and engaged in a slot 307 in the hub portion of the finger as shown in Fig. 2. A torsion spring 308 acting between the shaft and the finger yieldably maintains the latter in the position shown in Fig. 2 with the pin 306 engaged against the lift end of the slot 307. The metering wheel 300 is dimensioned so that the finger 306 engages the trip arm 290 just before a bale reaches its full length. The finger biasing spring 292 exerts a substantially greater force than the spring 308 and consequently the finger remains stationary while the shaft 301 continues to rotate. The spring 308 is thus tensioned and, when the pin 306 reaches the opposite end of the slot 307, it establishes a positive driving connection between the shaft and the finger and the latter then rotates to swing the trip arm out of engagement with the head 294 of the release arm. This brings about the engagement of the clutch as above described. In practice the metering finger 305 is dimensioned so that it can pass the trip arm 290 as the latter swings to trip position and the stored power of the spring 308 then snaps the finger ahead to its normal position to afford clearance for the clutch parts as the driven clutch member starts to rotate.

It will be evident from the foregoing that the novel clutch and trip mechanism is simple in construction and very compact. The metering finger 305 which actuates the clutch trip arm, is carried directly on the short metering wheel shaft supported closely adjacent the clutch. Complicated linkages and the like are thus eliminated. The trip mechanism is easily accessible for adjustment and few of its parts are subject to wear or likely to get out of order in use.

We claim as our invention:

1. In a baler, in combination, bale tying mechanism including a drive shaft, a clutch operative to drive said shaft in cycles of a single revolution from a predetermined starting point, means for engaging and disengaging said clutch including a trip arm rotatable with the shaft and pivoted to swing about an axis transverse to the axis of the shaft between two positions, spring means yieldably retaining said arm in one of said two positions, stop means disposed in the path of rotation of said arm about the axis of said shaft when in said one position, said clutch being disengaged upon interception of said arm by said stop means, a metering device operated as an incident to the formation of a bale in the baler, and means forming a part of said metering device for swinging said arm about its pivot from said one position to its other position to clear said stop means and thereby effect engagement of said clutch.

2. A baler as defined in claim 1 in which the metering device includes a rotating metering shaft having one end closely adjacent to clutch, said metering shaft carrying a radially projecting finger positioned to engage the clutch trip arm and in which the finger has a lost motion connection with the metering shaft and is biased by a spring effective to snap it out of the path of the trip arm upon engagement of the clutch.

3. In a bale tying mechanism, in combination, a drive shaft, clutch means for driving said shaft comprising a driving element rotatably mounted on said shaft, said driving element having a bell shaped housing with an inwardly projecting dog on its peripheral wall, a driven member nonrotatably mounted on said shaft having a hub portion extending into said housing, a clutch finger mounted for rotation with said driven member, said finger being pivoted on said hub to swing into and out of the path of said dog, spring means yieldably urging said finger into the path of the dog to engage the clutch, an arm pivoted on said finger to swing transversely of the plane of rotation of the finger, spring means yieldably urging said arm to an operated position, stop means disposed in the path of said arm when in operated position and engageable by the arm to swing said finger to disengaged position as an incident to the rotation of said driven member, and means for swinging said arm out of engagement with said stop means to free said finger for movement by its associated spring into clutch engaging position.

4. In a baler having an elongated chamber along which bales pass in their formation, the combination of a shaft supported on and extending transversely across the chamber, a clutch operative to drive said shaft in cycles of a single revolution including a driven member fixed to the shaft, a continuously rotating driving member, means for engaging and disengaging said clutch members comprising a stop supported on said chamber, a trip arm pivotally mounted on said driven clutch member and yieldably urged into a position to engage said stop to interrupt rotation of the driven member, a metering device including a toothed wheel, a metering shaft supporting said wheel in a position to engage a bale moving along said chamber, means supporting said metering shaft with one end closely adjacent said clutch, and a finger mounted directly on said metering shaft operative to swing said trip arm out of engagement with said stop incident to the rotation of the metering shaft by said toothed wheel.

5. In a baler having an elongated chamber along which bales pass in their formation, the combination of a shaft supported on and extending transversely across the chamber, a clutch operative to drive said shaft in cycles of a single revolution including a driven member fixed to the shaft, a continuously rotating driving member, means for engaging and disengaging said clutch members comprising a stop member supported on the chamber, a movable trip arm carried by and rotatable with said driven clutch member, said trip arm being normally disposed in a position to engage said stop and interrupt the rotation of the driven member, a metering device including a shaft, a toothed wheel fixed at one end of the shaft, a finger mounted adjacent the other end of said shaft and projecting radially therefrom, and means supporting said metering shaft with the edge portion of said wheel projecting into the baling chamber and with said finger positioned to engage said trip arm to move it out of engagement with said stop.

6. In a bale tying mechanism including a drive shaft, a clutch operative to drive said shaft in cycles of a single revolution comprising, a driven member fixed to the shaft, a continuously rotating driving member supported on the shaft adjacent said driven member, a tooth on said driving member, a finger pivoted on said driven member to swing into and out of the path of said tooth to establish and interrupt the driving connection between the clutch members, spring means yieldably urging said finger into clutch engaging position, a stop, a trip arm mounted on said finger and rotatable with the driven clutch member in a path intercepting said stop, said arm acting to swing said finger to disengaged position upon engagement with the stop, means supporting said trip arm for pivotal movement to a position clear of said stop to release said finger for return to clutch engaging position by said spring means, and means for swinging said trip arm to clutch engaging position.

7. A baler as defined in claim 6 in which the trip arm is returned by spring means to a position to intercept the stop before the driven member completes a single revolution.

References Cited in the file of this patent
UNITED STATES PATENTS

| | | |
|---|---|---|
| 734,502 | Beall | July 28, 1903 |
| 2,546,324 | Tuft et al. | Mar. 27, 1951 |
| 2,634,840 | Bornzin | Apr. 14, 1953 |
| 2,636,582 | Harrington et al. | Apr. 28, 1953 |
| 2,746,584 | Skromme | May 22, 1956 |

FOREIGN PATENTS

| | | |
|---|---|---|
| 850,199 | France | Sept. 4, 1939 |

UNITED STATES PATENT OFFICE

CERTIFICATE OF CORRECTION

Patent No. 2,879,709                                 March 31, 1959

Noral A. Nelson et al.

It is hereby certified that error appears in the above numbered patent requiring correction and that the said Letters Patent should read as corrected below.

In the grant, lines 1 and 2, for "Noral A. Nelson, of Holland, and William A. Wathen, of Detroit, Michigan," read -- Noral A. Nelson, of Holland, and William A. Wathen, of Detroit, Michigan, assignors to Massey-Ferguson, Inc., a corporation of Maryland, --; line 11, for "Noral A. Nelson and William A. Wathen, their heirs" read -- Massey-Ferguson, Inc., its successors --; in the heading to the printed specification, lines 3 and 4, for "Noral A. Nelson, Holland, and William A. Wathen, Detroit, Mich." read -- Noral A. Nelson, Holland, and William A. Wathen, Detroit, Mich., assignors to Massey-Ferguson, Inc., a corporation of Maryland --.

Signed and sealed this 25th day of August 1959.

(SEAL)
Attest:

KARL H. AXLINE

Attesting Officer

ROBERT C. WATSON

Commissioner of Patents